US008255557B2

(12) United States Patent
Raciborski et al.

(10) Patent No.: US 8,255,557 B2
(45) Date of Patent: *Aug. 28, 2012

(54) PARTIAL OBJECT DISTRIBUTION IN CONTENT DELIVERY NETWORK

(75) Inventors: Nathan F. Raciborski, Jackson, WY (US); Wylie Swanson, Tempe, AZ (US); Jacob S. Roersma, Grand Rapids, MI (US); Bryan D. Black, Tempe, AZ (US); Albert P. Tobey, Tempe, AZ (US)

(73) Assignee: Limelight Networks, Inc., Tempe, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/217,101

(22) Filed: Aug. 24, 2011

(65) Prior Publication Data

US 2011/0307586 A1   Dec. 15, 2011

Related U.S. Application Data

(63) Continuation of application No. 12/835,635, filed on Jul. 13, 2010, now Pat. No. 8,090,863.

(30) Foreign Application Priority Data

Apr. 7, 2010  (AU) ................................ 2010202034

(51) Int. Cl.
*G06F 15/16* (2006.01)
(52) U.S. Cl. ........................................ 709/231; 709/219
(58) Field of Classification Search .......... 709/231–232, 709/217–219; 725/54–55, 71–74, 85–87, 725/91–94, 114–116
See application file for complete search history.

(56) References Cited

U.S. PATENT DOCUMENTS

| 6,199,107 B1 | 3/2001 | Dujari |
| 6,754,699 B2 | 6/2004 | Swildens et al. |
| 6,904,449 B1 | 6/2005 | Quinones |

(Continued)

FOREIGN PATENT DOCUMENTS

KR   1020030029244.00 A   4/2003

(Continued)

OTHER PUBLICATIONS

Chen, S. et al., "SProxy: A Caching Infrastructure to Support Internet Streaming," IEEE Transactions on Multimedia, Aug. 2007, pp. 1062-1072, vol. 9 No. 5.

(Continued)

*Primary Examiner* — Chirag R Patel
(74) *Attorney, Agent, or Firm* — Kilpatrick Townsend & Stockton LLP

(57) ABSTRACT

Techniques for the distribution of content objects in a content delivery network (CDN) are disclosed. In one embodiment, a CDN distribution server detects the availability of a content object and determines whether the content object is a candidate for distribution. The distribution server may detect the availability of the content object in response to a provider making new or updated content available at a content site or a location within the CDN. The distribution server obtains identifying information for a candidate content object and determines a select portion of the content object to be distributed within the CDN. The select portion can be a predetermined number of bytes located at a predetermined position in the content object, the size and location of which may be determined according to content-specific mapping data. The distribution server may push the select portion of the content object to one or more groups of CDN edge servers absent an end-user request.

29 Claims, 9 Drawing Sheets

U.S. PATENT DOCUMENTS

| | | |
|---|---|---|
| 7,028,096 B1 | 4/2006 | Lee |
| 7,096,266 B2 | 8/2006 | Lewin et al. |
| 7,158,986 B1 | 1/2007 | Oliver et al. |
| 7,600,025 B2 | 10/2009 | Lewin et al. |
| 7,613,792 B2 | 11/2009 | Zervas et al. |
| 7,752,258 B2 | 7/2010 | Lewin et al. |
| 7,814,172 B2 | 10/2010 | Martin et al. |
| 2001/0027493 A1 | 10/2001 | Wallace |
| 2001/0049732 A1 | 12/2001 | Raciborski et al. |
| 2002/0007418 A1 | 1/2002 | Hegde et al. |
| 2002/0087660 A1 | 7/2002 | Martin et al. |
| 2002/0091801 A1 | 7/2002 | Lewin et al. |
| 2003/0046335 A1 | 3/2003 | Doyle et al. |
| 2004/0128343 A1 | 7/2004 | Mayer |
| 2005/0055426 A1 | 3/2005 | Smith et al. |
| 2005/0086386 A1 | 4/2005 | Shen et al. |
| 2006/0015637 A1 | 1/2006 | Chung |
| 2006/0026663 A1 | 2/2006 | Kortum et al. |
| 2006/0126556 A1 | 6/2006 | Jiang et al. |
| 2006/0140180 A1 | 6/2006 | Du Breuil |
| 2006/0282522 A1 | 12/2006 | Lewin et al. |
| 2007/0043817 A1 | 2/2007 | Oliver et al. |
| 2007/0061411 A1 | 3/2007 | Laughlin et al. |
| 2008/0146204 A1 | 6/2008 | Gu et al. |
| 2010/0023601 A1 | 1/2010 | Lewin et al. |
| 2010/0293221 A1 | 11/2010 | Sidman et al. |
| 2010/0312861 A1 | 12/2010 | Kolhi et al. |
| 2010/0318632 A1 | 12/2010 | Yoo et al. |
| 2011/0093926 A1 | 4/2011 | Martin et al. |

FOREIGN PATENT DOCUMENTS

| | | |
|---|---|---|
| WO | 2011022405 A2 | 2/2011 |

OTHER PUBLICATIONS

International Search Report and Written Opinion dated Aug. 30, 2011 for International PCT Application No. PCT/US2010/062142, 8 pages.

Jin, Shudong., et al., "Accelerating Internet Streaming Media Delivery using Network-Aware Partial Caching," Proceeding ICDCS '02 Proceedings of the 22nd International Conference on Distributed Computing Systems, retrieved from http://www.cs.bu.edu/fac/best/res/papers/icdcs02.pdf on May 1, 2012, 2002, 8 pages.

| Provider ID | Content Location | Content positioning | Content Type | Multicast Group |
|---|---|---|---|---|
| Alpha | O1 | Yes | Video | M1-M4 |
| Beta | O1 | No | --- | N/A |
| Gamma | O3 | Yes | Audio, Video, Ebooks | M6, M11 |
| ⋮ | ⋮ | ⋮ | ⋮ | ⋮ |

| Content ID | Content Type | Bytes | Offset |
|---|---|---|---|
| 6F 23 | Doc.L | 2 | 0 |
| F7 8B | Video.X | 6 | 0 |
| 30 B2 | Audio.Q | 3 | 1 |
| ⋮ | ⋮ | ⋮ | ⋮ |

*FIG. 5*

| Multicast Group addr | Sequence ID | Content Name | Partial content object payload |
|---|---|---|---|

*FIG. 6*

PARTIAL OBJECT DISTRIBUTION IN CONTENT DELIVERY NETWORK

CROSS-REFERENCE TO RELATED APPLICATION

This application is a continuation of U.S. application Ser. No. 12/835,635, filed Jul. 13, 2010, which claims priority to Australian Patent Application Serial No. 2010202034, filed Apr. 7, 2010, which is incorporated herein by reference in its entirety.

BACKGROUND

Providers of digital content need a reliable and efficient means of delivering their products to consumers. Many content providers lack the infrastructure required to meet high levels of demand from widely dispersed end users. This lack of infrastructure can translate into poor quality of service and a generally bad online experience.

Content delivery networks (CDNs) maintain a presence throughout the Internet and host content objects for content providers as a service. In this arrangement, a content provider offloads delivery of its content objects to the CDN. The CDN, in turn, enables distribution of large volumes of content to end user with a greater reliability and efficiency than would be possible from a centralized distribution system.

BRIEF SUMMARY

Techniques for the distribution of content objects in a content delivery network (CDN) are disclosed. In one embodiment, a CDN distribution server detects the availability of a content object and determines whether the content object is a candidate for distribution. The distribution server may detect the availability of the content object in response to a provider making new or updated content available at a content site or a location within the CDN. The distribution server obtains identifying information for a candidate content object and determines a select portion of the content object to be distributed within the CDN. The select portion can be a predetermined number of bytes located at a predetermined position in the content object, the size and location of which may be determined according to content-specific mapping data. The distribution server may push the select portion of the content object to one or more CDN edge servers absent an end-user request.

In one embodiment, a method of distributing content in a CDN is disclosed. An indication that a content object is available at a first location of the CDN is received at a distribution server. The indication may be an event triggered when a new content object or an updated content object is uploaded to a CDN origin server. The distribution server can obtain information relating to the content object from the origin server and can determine whether the content object is a candidate for distribution. The distribution server can also compare the information relating to the content object with a set of mapping data. If it is determined that the content object is a candidate for distribution, a select portion of the content object can be identified for distribution based on the mapping data. The distribution server can retrieve the select portion of the content object from the origin server and can determine a plurality of edge servers to receive the select portion of the content object. The select portion of the content object can be sent to the plurality of edge servers in a multicast communication.

In another embodiment, a content distribution server is disclosed. The content distribution server includes a messaging subsystem coupled to a content delivery network (CDN). The messaging subsystem may exchange event messages with a plurality of CDN edge servers. The content distribution server also includes a memory which may store mapping data or a reference to mapping data available elsewhere in the CDN. The mapping data can include content identifiers and byte values corresponding to the content identifiers. The content distribution server can include one or more processors that receive event messages from the messaging subsystem indicating that a content object is available at a first location of the CDN. The one or more processors can determine whether the content object is a candidate for positioning at edge servers of the CDN and can obtain an identifier associated with the content object. Using the identifier and the mapping data, the content distribution server can obtain a portion of the content object from the first location. The content distribution server can identify a plurality of recipient edge servers and can send the partial content object over the CDN.

In yet another embodiment, a content delivery system is disclosed. The content delivery system includes a distribution server and a plurality of edge servers that are arranged into one or more multicast groups. The distribution server includes a messaging interface which detects the availability of a content object at a first location of the content delivery system. Detecting the availability of the content object may be done without first receiving a request for delivery of the content object. The distribution server also includes an object analyzer which determines whether the content object is a candidate for positioning and obtains mapping information associated with the content object. The object analyzer can retrieve a portion of the content object from the first location based on the mapping information when it is determined that the content object is a candidate for positioning. The distribution server also includes a multicast group manager for determining a target multicast group to receive the portion of the content object in accordance with content provider information. The multicast group manager can send the portion of the content object to the multicast group of edge servers asynchronously with other CDN operations.

Each edge server in the multicast group may include a request interface for receiving a content request from an end user computer and for sending a requested content object to the end user computer. The edge servers may also include a CDN interface for receiving a multicast message that contains the portion of the content object. A byte store at each edge server may be configured to store partial content objects. The partial content objects may include a number and selection of bytes that varies according to a type of a corresponding full content object. A storage controller can add the portion of the content object received from the distribution server to the byte store and can retrieve data from the byte store in response to receiving the content request. The storage controller can generate a CDN event if it is determined that the byte store does not contain a partial content object associated with the content request.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

FIG. 5 shows exemplary mapping data.

FIG. 6 shows an exemplary multicast message.

In the figures, similar components and/or features may have the same reference label. In some cases, components of the same type are identified by following a first reference label with a dash and a second reference label that further distinguishes among the similar components. If only the first reference label is used, the description is applicable to any of the similar components designated by the first reference label.

DETAILED DESCRIPTION

The ensuing description provides preferred exemplary embodiment(s) only, and such preferred exemplary embodiments are not intended to limit the scope or applicability of the present invention. Rather, the ensuing description will enable those who are skilled in the art to implement such preferred exemplary embodiment(s). Persons of skill in the art will recognize that various changes may be made in the function and arrangement of elements without departing from the spirit and scope of the invention as set forth in the appended claims.

Figure 1:
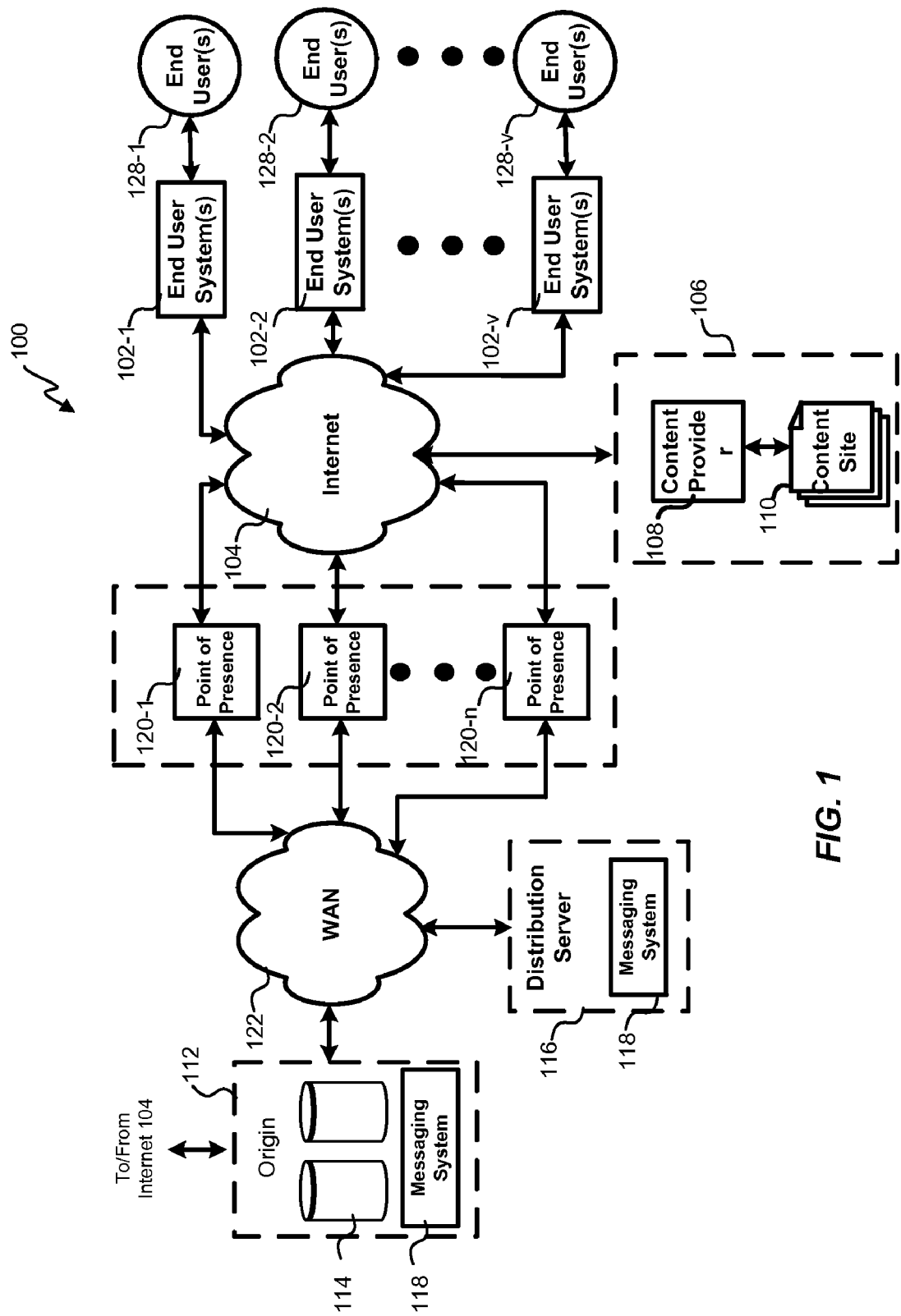
FIG. 1 shows an embodiment of a content distribution system.

Referring first to FIG. 1, a block diagram of an embodiment of a content distribution system 100 is shown in which a content originator 106 offloads delivery of content objects to a content delivery network (CDN). The content originator 106 produces and/or distributes the content objects and may include content providers 108 as well as content sites 110. The CDN delivers the content objects over the internet 104 to end users 128 via end user systems 102.

As illustrated, the CDN may include an origin server 112, a distribution server (also "control server") 116, and various points of presence (POPs) 120. POPs 120 can be deployed throughout content distribution system 100 and may serve content objects to end user systems 102 in a particular geographic area and/or through a particular service provider. For example, a POP 120 may be designated to serve content objects to end users 128 in a particular city, on a particular access network, or both, to facilitate efficient delivery and promote a good user experience. As used herein, a content object is any content file or content stream and could include, for example, video, pictures, data, audio, software, and/or text. In the specification, the terms content object, content, content stream, and/or content file, may be used interchangeably.

As content providers 108 create new content or update existing content, they may upload content objects to origin server 112 for distribution through the CDN. Origin server 112 includes storage 114 which maintains a copy of the content objects for one or more content providers 108 and may serve as a source of content objects within the CDN. In some embodiments, elements of the CDN may monitor content sites 110 and may copy new and/or updated content objects to origin server 112 as they become available.

When an end user 128 requests delivery of content through its respective end user system 102, the request may be passed either directly or indirectly via the internet 104 to a content site 110. The end user system 102 could be a personal computer, media player, handheld computer, Internet appliance, phone, IPTV set-top box, streaming radio or any other device that receives and processes content objects. The content site 110 could be a web site at which content is viewable with a web browser. Some or all of the content site 110 could also be accessible with application software other than a web browser.

When a content request is received, it may be redirected from content site 110 to a CDN location. This may involve formulating a delivery path and embedding the delivery path into URLs associated with a web page or some other mechanism. Once the request for content is passed to the CDN, it can be assigned to a POP 120 which, in turn, manages delivery of the requested content object to the end user system 102.

If the content object is not available at the designated POP location, a request for the content object can be propagated toward the core of the CDN and may ultimately be fulfilled from storage 114 at origin server 112. In a sense, the content object is pulled through the CDN to a POP 120 from which it can be distributed to requesting end user systems 102. Following a request, the full content object may be cached at one or more locations between the core CDN and the network edge. Subsequent requests for the content object can be fulfilled from the cached locations.

Pulling content objects from origin server 112 to a requesting end user system 102 can be time consuming and resource intensive. On the other hand, maintaining a copy of every content object at the CDN edge is inefficient as many content objects are requested only infrequently. Moreover, if all objects were permanently stored at edge locations, the resulting system would have limited scalability.

Distribution server 116 balances the need to provide rapid delivery of content objects to end users 128 with the need to make efficient use of network resources. Distribution server 116 can monitor the state of content objects at origin server 112 and detect when a content provider 108 uploads new or modified content objects to storage 114. In various embodiments, distribution server 116 may be coupled to a messaging system 118 of the CDN and may receive notifications over WAN 122 when content-related events occur at origin server 112. Messaging system 118, for example, can be middleware based on the Advanced Message Queuing Protocol (AMQP). CDN messaging can be a publish-and-subscribe, request-response, or some other linkage by which distribution server 116 monitors, detects, and/or is alerted to content related events at origin server 112.

When a new content object is added or an existing content object is changed, distribution server 116 performs an analysis to determine whether the change should be reflected in the CDN. The determination of whether to act upon events at origin server 112 can be based on requirements of the content provider, the type of content object, geographic considerations, network considerations, end user considerations, or a combination of many factors. For example, a content provider 108 may wish to target its content objects to users in a particular geographic area who will access the content in a particular data format using a particular type of software application such as a music player, a video player, a document viewer, etc.

If distribution server 116 determines that a CDN event is actionable, it may obtain metadata relating to the content object or portions of the content object itself from origin server 112. Using this information, distribution server 116 can determine a partial content object for distribution to POP locations in the CDN. The partial content object can include a small number of bytes or other data units determined based on the type of content. For example, if the content object is a Window Media Video (WMV) file, distribution server 116 may select bytes indicative of the codec, frame size, and other attributes relevant to content playback. In some embodiments, distribution server 116 maintains a content-specific mapping by which the position(s) of relevant data units is determined.

When the relevant portion of the content object is obtained from origin server 112, distribution server 116 determines where in the CDN it should be distributed. This operation can be performed separately or it can be combined with the determination of whether an event at origin server 112 is actionable. For example, the determination of whether an event is actionable may lead to a further determination of which parts of the CDN are affected. Thus, if Company X wishes to target the Los Angeles market for distribution of content for mobile devices, distribution server 116 may determine both that a new file event relating to Company X content is actionable and that the portion (or portions) of the new content object determined by analysis should be distributed to POPs 120 serving the appropriate geographic area, hardware platform, software platform, etc.

In some embodiments, server 116 sends partial content to POPs 120 in one or more multicast data packets. Note that, unlike request-driven operations, server 116 may push partial content to the POPs 120 in response to events occurring at origin server 112. Advantageously, this process can be performed asynchronously to other CDN operations and may avoid the need to pull data (or to simulate a pull) in order to move the partial content to edge locations.

Edge servers at POPs 120 receive the multicast packets and may add the partial content object(s) to a local data store. Because the multicast packets often include only a few bytes of a content object, partial content objects for an entire content library can be readily maintained in the local data store. Also, scalability in the CDN is preserved as edge servers can be efficiently added, updated, or removed with a minimal impact to CDN operations. Moreover, when a content request is received, the partial content object can be distributed quickly to the requesting end user system 102 and used by client software to prepare for receiving the full content object. For example, relevant bytes of a WMV content object can be passed immediately to the end user system for starting the client software, selecting the appropriate codec, resizing the viewer window, updating the file properties, etc. In this way, the perceived responsiveness of the CDN is improved even when the full content object must be retrieved from a remote location.

Figure 2:
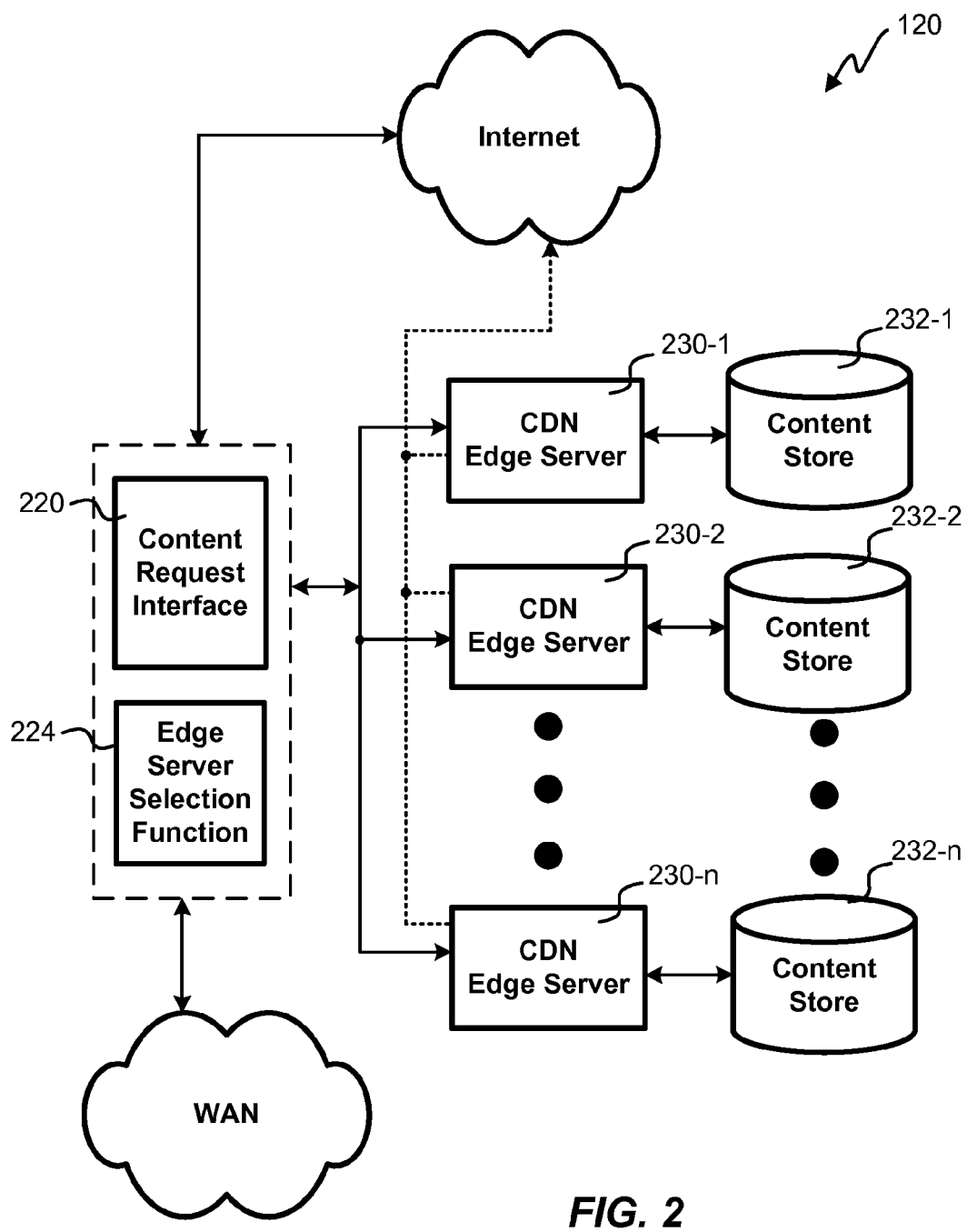
FIG. 2 shows an embodiment of a CDN point of presence.

Referring next to FIG. 2, a block diagram of an embodiment of a POP 120 is shown which can be one of many dispersed throughout the CDN. In this embodiment, POP 120 includes a content request interface 220, an edge server selection function 224, and a plurality of edge servers 230 each with a corresponding content store 232. As discussed previously in connection with FIG. 1, when a request for content is handed over to the CDN, it may be associated with a particular POP 120 which will handle delivery of the requested content object to the end user.

The designated POP 120 receives the content request through a content request interface 220. The edge server selection function 224 assigns the request to an edge server 230 which is responsible for sending the content object to the requesting end user system 102. The edge server selection function 224 may select an edge server (e.g., 230-2) from a group of edge servers 230 at a POP through domain name service (DNS) resolution, by redirecting the request, or other known mechanisms.

Various parameters may be taken into account by the edge server selection function 224 in selecting the edge server 230. Examples of parameters influencing selection of a particular edge server may include content object characteristics, servers assigned to a particular content provider, adequate quality of service (QoS), performance metrics, capabilities of the CDN edge server 230, and/or routing efficiency between the edge server 230 and the end user system 102. Note that each POP location may include any number of edge servers.

Once the request for content is assigned, the selected edge server 230 determines if a partial content object corresponding to the requested content is available in its associated content store 232. If the partial content object is available, it can be sent rapidly to the requestor so that preparations for receiving the full content object can begin and the end user 128 experience is enhanced. As the partial content object is sent, the full content object can be retrieved from one or more caching locations within the POP 120 or otherwise accessible to the selected edge server 230. In this way, the requested content object is distributed to the end user 128 in an efficient, localized manner.

If the partial content object is not available in the content store 232 of the assigned edge server 230, the requested content object may be retrieved from a remote location. The remote location may be the origin server 112 or another CDN server in the same or a different POP 120. The requested content object may then be stored in a cache accessible to the selected edge server 230 and distributed to the requesting end user 128. With respect to the full content object, the edge server 230 can act as a caching proxy and can pass requests for content objects not available in its multi-layer cache through to the core network.

As part of the content retrieval process, the selected edge server 230 may generate an event or otherwise signal to distribution server 116 that its partial object content store 232 needs to be updated. When a new edge server 230 is added to a POP, for example, its content store 232 may need to be reconciled with the current state of distribution server 116. Alternatively, when an edge server 230 is returned to service after being offline, its content store 232 may need an incremental update. The edge server selection function 224 ensures that invalid data is not served while updates are pending.

Figures 3, 4:
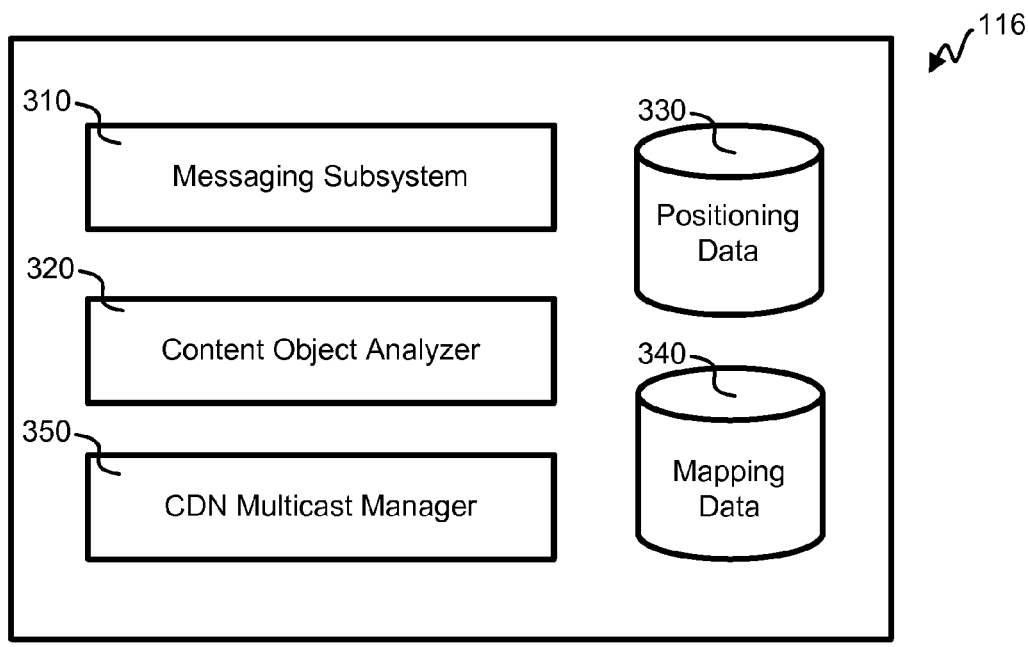
FIG. 3 shows an embodiment of a content distribution server.
FIG. 4 shows exemplary positioning data.

Referring next to FIG. 3, a functional block diagram of an embodiment of a distribution server 300 is shown. Distribution server 300 can be used in content distribution system 100 and includes a messaging subsystem 310, a content object analyzer 320, and a multicast group manager 350. Messaging subsystem 310 can send messages to and receive messages from other elements of the CDN, including origin server 112, POPs 120, and edge servers 230. The messages can be generated by middleware using a proprietary or a standardized protocol such as AMQP and may follow a publish-and-subscribe, request-response, or other communications paradigm. In one embodiment, distribution server 300 subscribes to events at origin server 112 and publishes its events to edge servers 230 through a broker, although many variations are possible within the scope of the present invention.

Messaging subsystem 310 conveys CDN events of interest to content object analyzer 320. CDN events may include a file creation event, a file update event, a policy change event, or other occurrence relating to the positioning and/or distribution of content objects. For example, when a content provider 108 uploads a content object to origin server 112, the origin server file system may generate a file creation event. The file creation event can be propagated to distribution server 300 and received by messaging subsystem 310 as a subscriber to content-related file system events. As another example, distribution server 300 may periodically request updates in accordance with a content provider's distribution policies and receive responses with updated information.

When a content-related event is detected, messaging subsystem 310 notifies content object analyzer 320. Content object analyzer 320 may request information about the content object from origin server 112. For example, content object analyzer 320 may request metadata for a new or changed object. In some cases, the metadata is created by the content provider 108 and may include information about the type of file and the policies or business rules applicable to its distribution within the CDN. Alternatively or additionally, content object analyzer 320 may obtain relevant information about the content object by executing a process on a server where the content object is located. For example, the content object analyzer 320 may gather output from a file analysis process that is performed at origin server 112.

Content object analyzer 320 utilizes the content object information to determine whether the content object is a candidate for partial object positioning within the CDN. In one embodiment, content object analyzer 320 compares the information to positioning data 330 maintained at distribution server 116. Positioning data 330 may reflect business rules, customer service agreements, and other decisioning data relevant to whether a particular class of objects from a content provider should be distributed and at what CDN location or locations partial object distribution should occur.

FIG. 4 shows exemplary positioning data 400 such as can be utilized with distribution server 300. For convenience, positioning data 400 is shown as having a tabular format but can be any suitable data structure. Provider ID and content location columns can be used to identify content objects for a particular content provider 108 available at a particular content site or CDN location. A content type column can be used for associating an entry in positioning data 400 with a particular type of content such as videos, music, e-books, documents, etc. Content positioning and multicast group columns may indicate whether the specified content should be positioned in the CDN and, if so, where it should go.

Content object analyzer 320 matches the information about the new/updated content object to the positioning data 400 and determines whether to take further action. For example, based on the exemplary positioning data, if it is determined that the new/updated content object is a video object uploaded by provider Alpha to location O1, then content object analyzer 320 may determine that a portion of the object should be distributed to multicast groups M1, M2, M3, and M4. On the other hand, if the new/updated content object was uploaded by provider Beta to location O2, then partial object positioning is not required. As previously noted, decisions regarding partial object positioning in the CDN can be made on the basis of customer agreements, target markets, demand levels, content categories, target computing platforms, or any combination of factors.

When a decision to place the content is made, content object analyzer 320 determines which portion (or portions) of the content object should be distributed. This determination can be made on the basis of mapping data 340 maintained at distribution server 300. The mapping data 340 can be used to identify relevant portions of the content for extraction by distribution server 300. The portions or partial content objects can then be distributed to the multicast groups identified from positioning data 330.

FIG. 5 shows exemplary mapping data 500 such as can be utilized with distribution server 300. As with positioning data 400, mapping data 500 is shown in tabular format but can be any suitable data structure. A content ID column includes data corresponding to the type of content object. In the example, content ID represents file magic information which uniquely identifies a type of the content object (e.g., Doc.L, Video.X, Audio.Q, etc) and may optionally reflect additional information such as container type, audio codec, and/or video codec information. The presently described embodiment, however, is not limited to a particular form of content identification.

Content object analyzer 320 uses the information obtained about the new/updated content object to retrieve an entry from mapping data 340. For example, using exemplary mapping data 500, if the content identifier of a new/updated object is 0×F78B, then content object analyzer 320 would determine that a partial content object should include six (6) bytes taken from the start of the file (offset=0). On the other hand, if the content identifier of the new/updated object is 0×30B2, corresponding to the content type Audio.Q, then the content object analyzer 320 would determine that the partial content object should include the three (3) bytes that follow the first byte (offset=1) of the new/updated content object. In this way, mapping data 340 can specify a number of relevant bytes and a location of the relevant bytes in the content object according to the type of content. Using results from the mapping data, content object analyzer 320 can obtain a partial content object from origin server 112.

Multicast group manager 350 receives partial content objects and multicast group information from content object analyzer 320 and assembles one or more data packets for transmission to edge servers 230. For insance, using the multicast group information, multicast group manager 350 may transmit data packets containing partial content objects to edge servers 230 at one or more POP 120 locations.

FIG. 6 shows an exemplary multicast packet 600 such as can be generated by multicast group manager 350. As shown, multicast packet 600 includes a multicast group address, a sequence ID, a request name, and a partial content object payload. The multicast group address may correspond to the multicast group entry in positioning data 330 and can identify edge servers 230 to receive the partial content object payload. The sequence ID can represent a current state of distribution server 300 with respect to partial content objects for a particular content collection, a particular origin server, etc. As described below, the sequence ID can be used in a reconciliation or update process with edge servers. The content name corresponds to the identifier used by end user systems 102 to request the content object in the CDN and may, for example, be based on the object's URI or some other identifier.

Figure 7:
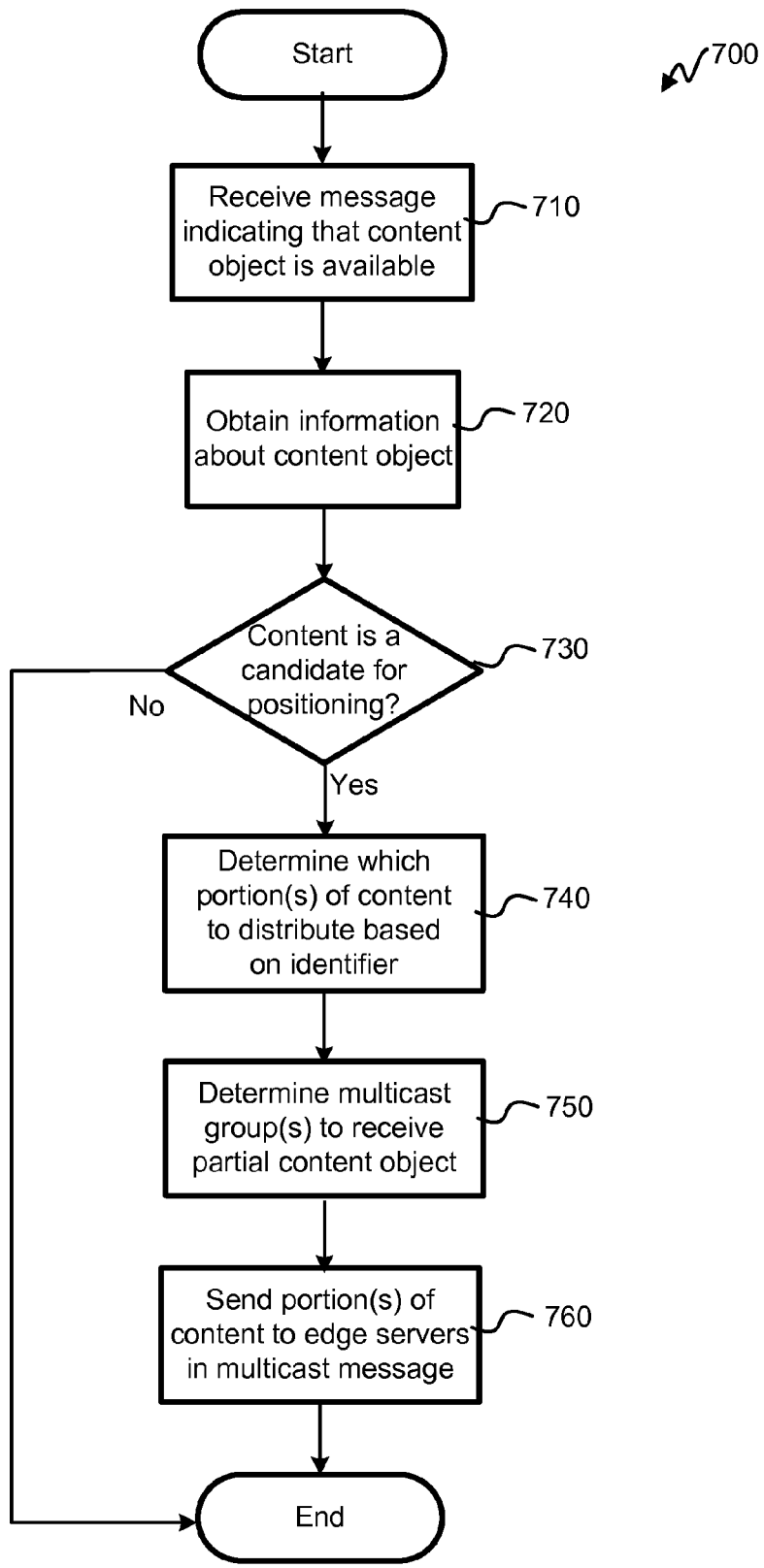
FIG. 7 shows an exemplary process for distributing partial content objects.

FIG. 7 is a flowchart illustrating an exemplary process 700 for distributing partial content objects in a CDN. Process 700 can be performed by a distribution server 116 operating within a CDN such as shown in FIG. 1. In some embodiments, process 700 is performed by one or more processors executing program instructions to control the operation of distribution server 300 as such operations are described in connection with FIG. 3. The program instructions and data elements may be stored on computer-readable storage medium such as random-access memory (RAM), read-only memory (ROM), flash memory, magnetic storage devices, optical storage devices, and the like.

At block 710, a message is received at the distribution server indicating a content object is available at a first location in the CDN. The message can be an event or notification triggered in the CDN when a content provider adds new content to an origin server or modifies an existing content object. Alternatively, the message can be a response to a content check initiated by the CDN to a location within a customer network. The new or updated content can be transferred from the customer network to a location in the CDN.

At block 720, the distribution server obtains information about the new or updated content objects. The information may include file metadata, identifiers, fingerprints, hashes, and the like. Based on the information, at block 730, the distribution server determines if the content is a candidate for partial object positioning in the CDN. The determination of whether the content is a candidate for positioning can be made by content object analyzer 320 based on criteria from positioning data 330 such as the content provider, the type of content, the location of the content, business rules, or any other combination of factors and placement logic. If it is determined that the content is not a candidate for partial object positioning, the process ends.

If it is determined that the object is a candidate for positioning, block 740, the distribution server determines one or more portions of the content object for distribution. In various embodiments, the portion (or portions) of the content object are selected by content object analyzer 320 using mapping data 340 such that a number of bytes and a location of the bytes are based on the type of content. Other considerations relevant to end user systems 102, such as the behavior of application software, may also influence selection of the partial content object. At block 750, the distribution server selects one or more multicast groups to receive the partial content object. The multicast groups can be selected based on positioning data 330 and may reflect the application of business rules relating to the content provider.

At block 760, the distribution server sends the partial content objects to edge servers of the selected multicast groups. In this way, partial content objects are pushed to edge locations rather than being pulled in response to content requests. Pushing the partial content objects does not require receipt of a content request or a simulated data pull and may be accomplished in a manner that is asynchronous to other CDN operations. By positioning the partial content objects at edge locations, overall user experience can be improved even when the full content object is obtained from other CDN locations.

Figure 8:
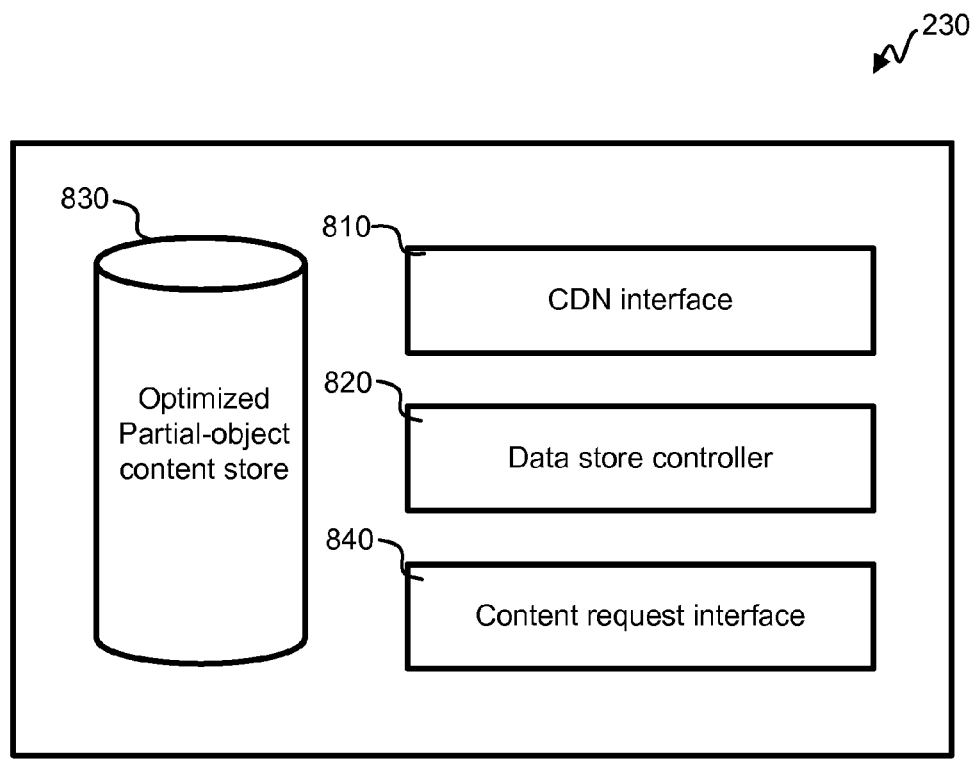
FIG. 8 shows one embodiment of an edge server.

FIG. 8 is a functional block diagram of one embodiment of an edge server 800 such as can be located in a POP 120 of content distribution system 100. As shown, edge server 800 includes a CDN interface 810, a data store controller 820, an optimized partial-object content store 830, and a content request interface 840.

CDN interface 810 receives multicast packets (such as shown in FIG. 6) from a distribution server and can extract the sequence ID, request name, and partial object payload, or other data elements. Data store controller 820 stores the partial object in an optimized content store 830 and updates a local sequence ID with information from the multicast packet. The object may be retrieved from content store 830 using a hash based on its URI or some other identifier. For example, if the multicast packet contains a partial content object consisting of two bytes from VIDEO.FLV, data store controller 820 writes the two byte portion to content store 830 in an entry corresponding to VIDEO.FLV. Data store controller 820 also records the sequence ID of the multicast packets as an indication of the state of the content store 830. Note that the process by which partial objects are added to content store 830 can be asynchronous to other operations of edge server 800 and does not depend upon end user requests. Also, from the CDN standpoint, partial content objects are pushed (not pulled) from the core network to the edge locations.

Content request interface 840 receives and processes content requests from end user systems. When a request is received, content request interface 840 passes an identifier of the requested object to data store controller 820. Data store controller 820 determines whether a partial content object corresponding to the requested content is available in content store 830. For example, data store controller 820 may attempt to match the requested content to an index of the bytes available in content store 830. If there is a match, controller 820 retrieves the partial object corresponding to the requested content and quickly sends it to the requestor. As previously indicated, the partial content object can be selected so as to enable the end user system to begin preparations for receiving the full content object by, for example, starting appropriate software, determining the appropriate codecs to use with the content object, adjusting the size and position of a viewer, etc.

If a corresponding partial content object is not available in content store 830, edge server 800 can check whether the requested object is found in one or more caching layers of the CDN. Caching layers can be arranged in relation to the various POPs 120 so as to hold content objects near the CDN edge thereby maximizing their availability. If the requested object is not found in the caching layers, it can be retrieved from the appropriate origin server and retained in one or more intermediate caching levels for responding to subsequent requests. In this situation, edge server 800 acts as a pass-through device in the delivery content from locations within the CDN to the end user system.

Edge server 800 can also signal, either directly or indirectly, to a distribution server 116 that a partial content object for requested content was not available in its content store 830. In some embodiments, edge server 800 includes a messaging system 118 by which it is linked to distribution server 116 and other elements of the CDN. Using the messaging system, data store controller 820 can trigger an event when a partial object is not available in content store 830, and distribution server 116 can respond to the event by performing a reconciliation process as described herein. Alternatively, distribution server 116 may monitor events at the CDN caching levels to determine when reconciliation of the particular edge server 800 or multicast group is appropriate.

Figure 9:
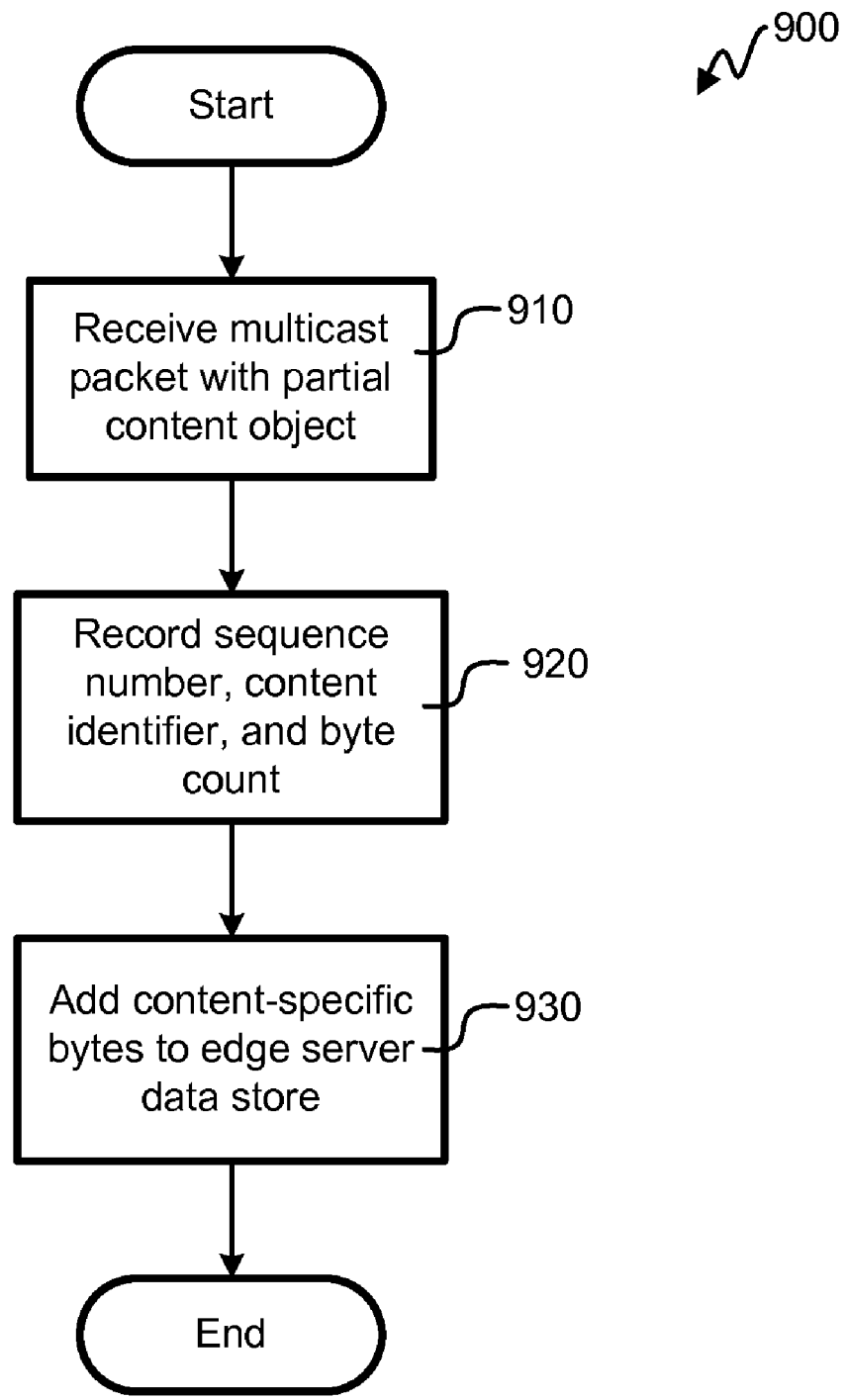
FIG. 9 shows an exemplary process for maintaining a partial object content store.

FIG. 9 is a flowchart showing an exemplary process 900 for maintaining a partial object content store. Process 900 can be performed by an edge server 230 operating within a CDN such as content delivery system 100 shown in FIG. 1. In some embodiments, process 900 is performed by one or more processors executing program instructions to direct the operations of edge server 800 as described in FIG. 8. The program instructions and data elements may be stored on a computer-readable storage medium such as random-access memory (RAM), read-only memory (ROM), flash memory, one or more magnetic storage devices, optical storage devices, and the like.

At block 910, the edge server receives a multicast data packet that contains a partial content object. The data packet can be similar to multicast packet 600 and may include various identifiers with partial content bytes. At blocks 920-930, the edge server extracts the identifiers and relevant bytes of the content object and records them in its content store. This may include associating the name of the content object with the relevant bytes and updating a sequence identifier for the partial object content store. When processing is complete, the partial content object is available for distribution from the edge server to end user systems.

Figure 10:
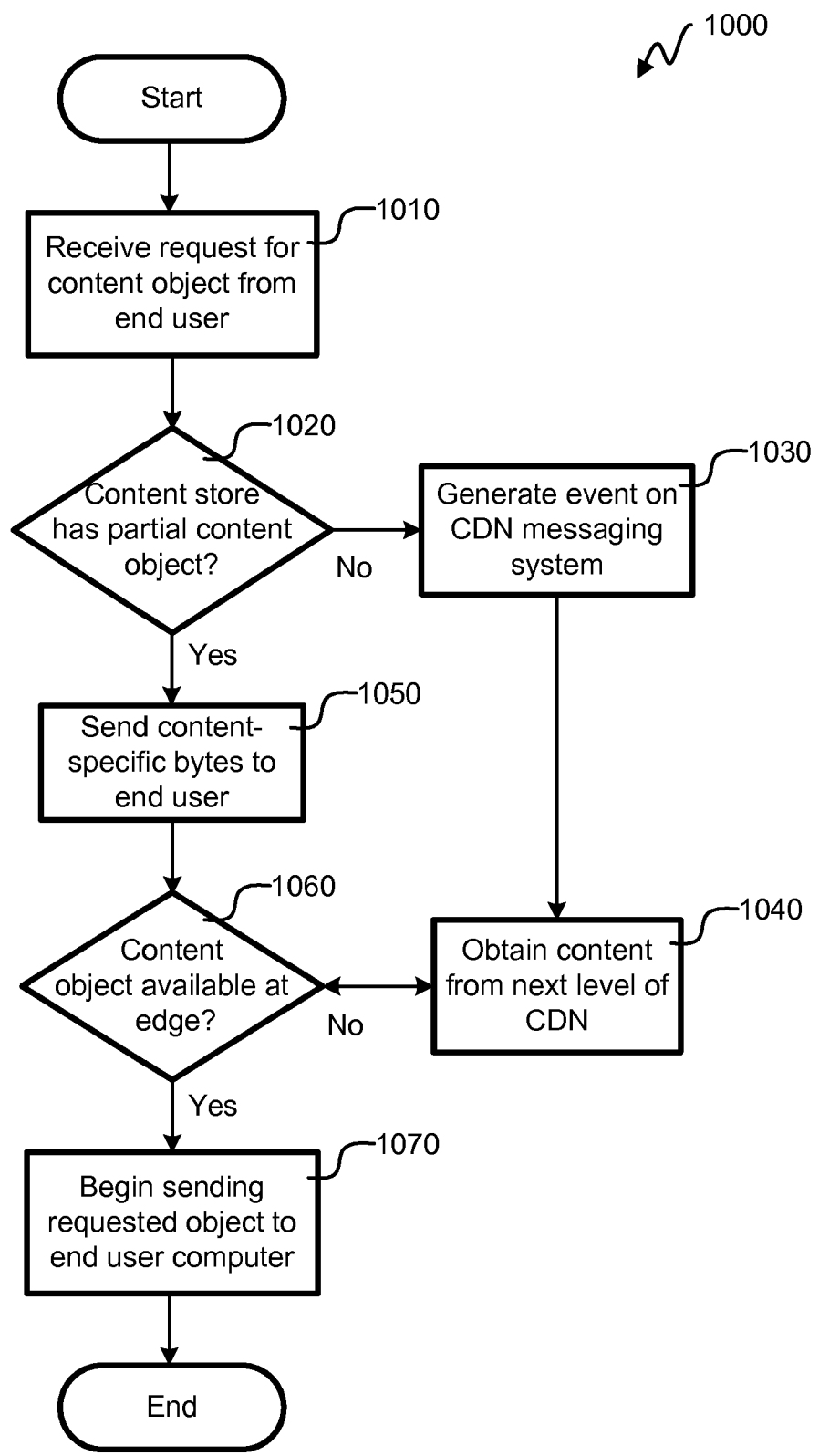
FIG. 10 shows an exemplary process for responding to a content request.

FIG. 10 is a flowchart showing an exemplary process 1000 for responding to a content request. Process 1000 can be performed by an edge server operating within a CDN such as content delivery system 100 shown in FIG. 1. In some embodiments, process 1000 is performed by one or more processors executing program instructions to direct the operations of edge server 800 as described in FIG. 8. The program instructions and data elements may be stored on a computer-readable storage medium such as random-access memory (RAM), read-only memory (ROM), flash memory, magnetic storage devices, optical storage devices, and the like.

At block 1010, a request for a content object is received at the edge server. The request may be directed to the edge server as part of an edge server selection function 224 at a POP location 120 as shown in FIG. 2. At block 1020, the edge server determines whether a partial object is available for the requested content. This may include searching a content store for an entry corresponding to the requested content. If an entry is found, block 1050, the edge server sends the content-specific bytes from its content store to the end user system from which the content request was received.

If a partial content object is not available, block 1030, the edge server may send a message on the CDN messaging system to indicate that it was not able to provide a partial content object. As indicated by block 1040, the message may accompany a search for the requested content at different caching levels and/or parts of the CDN. Once a determination is made regarding the partial content object, a check is made for the availability of the full content object at the edge location at block 1060. If the content object is not available at the edge, it is requested from other CDN storage and, at block 1070, the edge server sends the requested object to the end user system.

Figure 11:
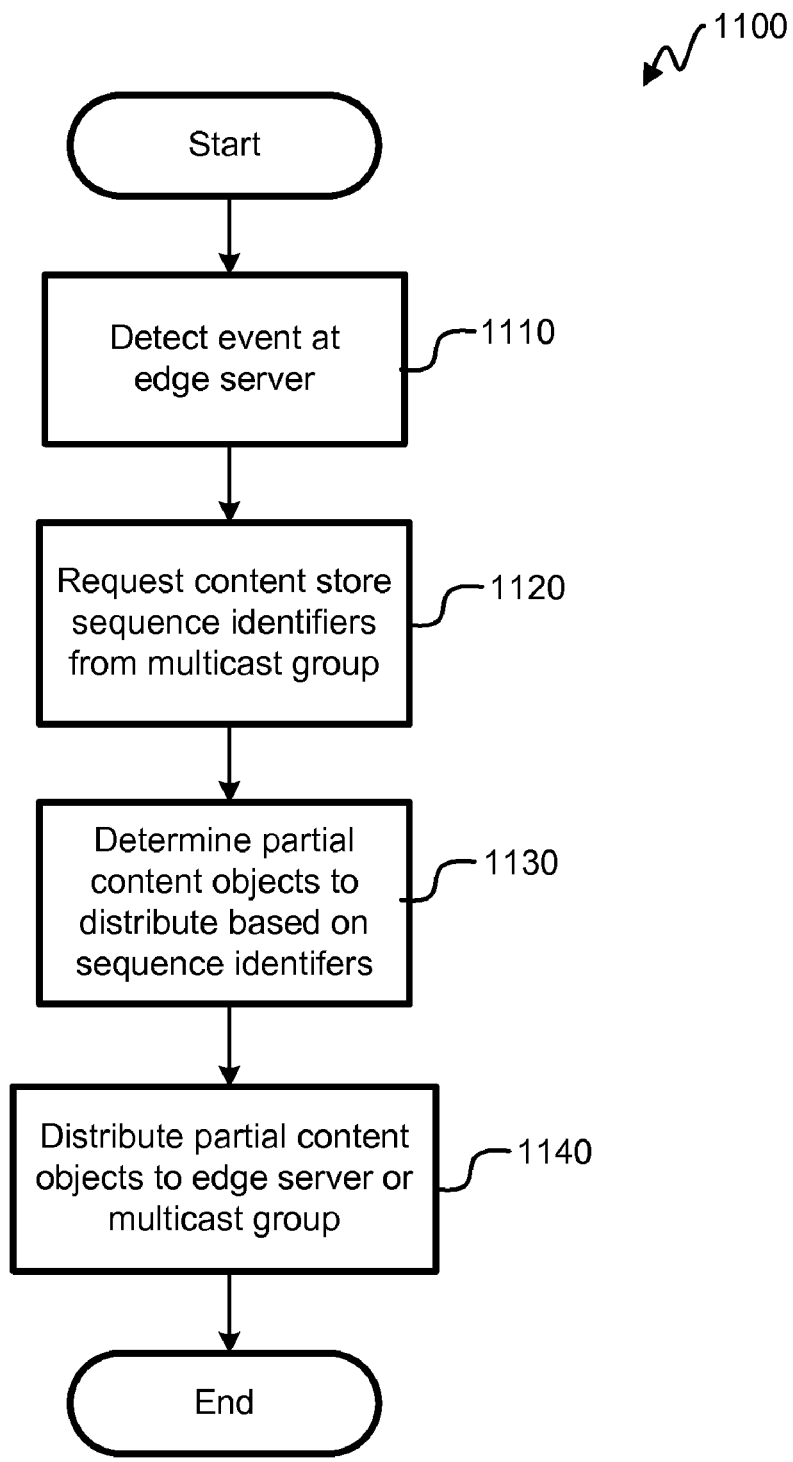
FIG. 11 shows an exemplary process for reconciling partial object content stores in a multicast edge server group.

FIG. 11 is a flowchart of an exemplary process 1100 for reconciling partial object content stores for a multicast edge server group. Process 1100 can be carried out by a distribution server 300, such as shown in FIG. 3, and can involve one or more processors executing program instructions. The program instructions can be stored with appropriate data elements on a computer-readable storage medium as previously described.

At block 1110, an edge server event is detected. The event may be received from the CDN messaging system when a partial content object is not available at an edge location or it may be triggered when an edge server requests content from a CDN location such as a deeper caching level or another POP location. At block 1120, the distribution server requests content store identifiers from edge servers belonging to a same multicast group as the edge server to which the event relates. For example, the distribution server may perform a lookup on the edge server address to obtain a multicast group address and then send a status request to the group address.

Based on information from the edge servers, block 1130, the distribution server can determine which partial content objects to distribute. In some embodiments, the distribution server matches a sequence ID in each response to a current sequence ID and sends a partial content update, block 1140, to individual edge servers via the edge server selection process according to the status of the respective content stores. For example, if a single edge server is taken offline and requires an update after being returned to service, the distribution server can send update packets to the edge server selection process at its point of presence. In another embodiment, the distribution server determines a lowest sequence ID from the edge server responses and sends update packets to the entire multicast group based on the lowest common denominator. When an edge server receives the multicast update packets, it retrieves the partial content payload and updates entries in its local content store accordingly. In this way, by operation of the distribution server, the local content store at one or more edge locations is reconciled with the most recent collection of partial content distributed within the CDN.

As will be understood by those skilled in the art, the present invention may be embodied in other specific forms. Those skilled in the art will recognize, or be able to ascertain using no more than routine experimentation, many equivalents to the specific embodiments of the invention described herein. Such equivalents are intended to be encompassed by the following claims.

What is claimed is:

1. A method of distributing partial content objects in a content delivery network (CDN), the method comprising:
   receiving at a distribution server an indication that a content object is available at a first point of presence;
   obtaining from the first point of presence information relating to the content object;
   determining, based on the obtained information, whether the content object is a candidate for distribution;
   upon determining that the content object is a candidate for distribution:
      comparing the information relating to the content object with mapping data to identify specific mapping data associated with the content object, the specific mapping data identifying a select portion of the content object;
      retrieving the select portion of the content object based on the specific mapping data, the select portion including at least one of information indicative of a content type associated with the content object, or information used by an end user system to prepare to playback the content object;
      determining a plurality of edge servers to receive the select portion of the content object; and
      not in response to an end user request for the content object, sending the select portion of the content object to the plurality of edge servers;
   receiving a request from an end-user device for the content object;
   assigning the request to a selected edge server at a second point of presence; and
   sending the select portion of the content object to the end-user device.

2. The method of claim 1, wherein the selected edge server is one of the plurality of edge servers.

3. The method of claim 1, wherein the selected edge server is assigned based at least partly on domain name service resolution.

4. The method of claim 1, wherein the selected edge server is assigned at least partly based on a delivery path derived from the request.

5. The method of claim 1, wherein the selected edge server is selected amongst a group of edge servers at the second point of presence.

6. The method of claim 1, wherein the selected edge server is assigned based on at least one of: a characteristic of the content object, servers associated with a provider of the content object, predicted quality of service, capabilities of the selected edge server, and routing efficiency.

7. The method of claim 1, wherein the select portion of the content object further comprises an identifier uniquely associated with the select portion.

8. The method of claim 1, further comprising:
   receiving an event from the selected edge server indicating that a partial content object associated with a content object requested by an end-user device is not available at the selected edge server; and determining partial content objects stored at least one of the plurality of edge servers, the at least one of the plurality of edge servers being different from the selected edge server.

9. The method of claim 1, wherein the plurality of edge servers are determined based at least partly on an identified provider of the content object.

10. The method of claim 1, wherein the plurality of edge servers are determined based at least partly on characteristics of the content object.

11. The method of claim 1, wherein obtaining information relating to the content object comprises obtaining metadata for the content object.

12. The method of claim 9, wherein the select portion of the content object comprises between one and ten data bytes of the content object.

13. The method of claim 1, further comprising receiving event messages at the distribution server from a messaging system of the CDN, and wherein the indication corresponds to a new-file event or a file-update event at the first location.

14. The method of claim 1, further comprising:
detecting that at least one edge server lacks a portion of a second content object that is a candidate for positioning;
obtaining the portion of the second content object at the distribution server; and
sending the portion of the second content object from the distribution server to the at least one edge server.

15. The method of claim 14, wherein detecting that the at least one edge server lacks a portion of a second content object comprises:
requesting a sequence identifier from each edge server in the plurality of edge servers; and
comparing the sequence identifiers to an index of candidate content objects at the distribution server.

16. The method of claim 14, wherein detecting that the at least one edge server lacks a portion of a second content object is responsive to receiving a cache-miss event message generated by the at least one edge server.

17. The method of claim 1, wherein the plurality of edge servers is determined based on a geographic coverage area.

18. The method of claim 1, wherein the specific mapping data identifies a number of bytes and a position within the content object of the select portion.

19. A content distribution server, comprising:
a messaging subsystem configured to receive event messages and to communicate with a plurality of edge servers over a content delivery network (CDN);
a memory configured to store mapping data comprising content identifiers and byte values corresponding to the content identifiers;
one or more processors configured to distribute content objects, wherein distributing content objects comprises:
determining whether the content object available at the first location is a candidate for positioning at edge servers of the CDN,
obtaining an identifier associated with the content object,
retrieving mapping data from the memory based on the identifier in response to determining that the content object is a candidate for positioning, the mapping data identifying a select portion of the content object,
obtaining from the first location the select portion of the content object based on the mapping data, the select portion including at least one of information indicative of a content type associated with the content object, or information used by an end user system to prepare to playback the content object, and
determining a plurality of edge servers to receive the portion of the content object,
sending, after receiving a request from an end-user device for the content object, the portion of the content object to the end-user device via an edge server assigned to the request,
wherein the content distribution server sends the portion of the content object to the plurality of edge servers over the CDN absent a request for the content object.

20. The distribution server of claim 19, wherein distributing content objects further comprising: assigning the request to a CDN point of presence.

21. The distribution server of claim 20, wherein distributing content objects further comprising: assigning the request to an edge server that is among a group of edge servers at the CDN region.

22. The distribution server of claim 20, wherein the request is assigned to a CDN region based on a delivery path included in the request.

23. The distribution server of claim 20, wherein the assigning is based at least partly on deriving a path from the user's request.

24. The distribution server of claim 19, wherein the memory is configured to store content provider information, and wherein determining whether the content object at the first location is a candidate for positioning is based on the content provider information.

25. The distribution server of claim 18, wherein the content provider information comprises a geographic area and the plurality of target edge servers is determined according to the geographic area.

26. The distribution server of claim 19, wherein the byte values comprise a number of bytes corresponding to a client application associated with the content object.

27. The content distribution server of claim 17, wherein the mapping data identifies a number of bytes and a position within the content object of the select portion.

28. A content delivery system (CDS), comprising:
a distribution server, comprising:
a messaging interface configured to detect the availability of a content object at a first location independent of a request for delivery of the content object,
an object analyzer configured to determine whether the content object is a candidate for positioning, the object analyzer further configured to obtain mapping information associated with the content object, the mapping information identifying a select portion of the content object, and to retrieve a portion of the content object from the first location based on the mapping information in response to a determination that the content object is a candidate for positioning, the portion of the content object including at least one of information indicative of a content type associated with the content object, or information used by an end user system to prepare to playback the content object, and
an edge-server group manager configured to determine a group of edge servers to receive the portion of the content object based on content provider information and, absent a request for the content object to send the portion of the content object to the group in a manner that is asynchronous to the operation of the messaging interface;
one or more request routers configured to route a request to a point of presence and to assign the request to one of a plurality of edge servers at the point of presence; and a plurality of edge servers arranged into an edge-server a-group, each edge server in the group comprising:
  a CDS interface configured to receive a group message with the portion of the content object from the distribution server,
  a byte store configured to store partial content objects at the edge server, said partial content objects comprising a number of bytes that varies according to a type of a corresponding full content object,
  a request interface configured to receive a content request and to send a content object to an end user computer in response to said content object request, and
  a storage controller configured to store the portion of the content object received from the distribution server in the byte store and to retrieve data from the byte store in response to receiving the content request after pre-population of the byte store, the storage controller configured to generate a CDS event if it is determined that the byte store does not contain a partial content object associated with the content request.

29. The method of claim 28, wherein the mapping information identifies a number of bytes and a position within the content object of the select portion.

* * * * *